Figure 5:
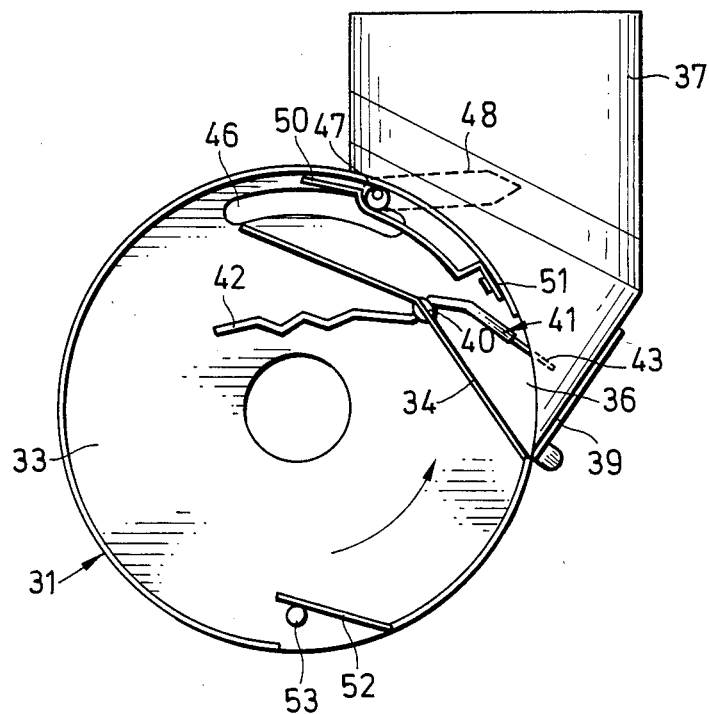

United States Patent [19]

Schoenmaekers

[11] Patent Number: 4,718,574

[45] Date of Patent: Jan. 12, 1988

[54] SOWING ASSEMBLY FOR SINGLE-SEED SOWING MACHINES

[75] Inventor: Jan Schoenmaekers, Meerssen, Netherlands

[73] Assignee: Messrs. H. Fahse & Co., Fed. Rep. of Germany

[21] Appl. No.: 782,004

[22] Filed: Sep. 30, 1985

[30] Foreign Application Priority Data

Feb. 23, 1985 [DE] Fed. Rep. of Germany ....... 8505231

[51] Int. Cl.$^4$ ................................................. A01C 7/04
[52] U.S. Cl. .................................... 221/203; 221/211; 111/77
[58] Field of Search ................ 221/211, 200, 202, 203, 221/266, 277, 278; 111/77, 78

[56] References Cited

U.S. PATENT DOCUMENTS

| 3,990,606 | 11/1976 | Gugenhan | 221/211 |
|---|---|---|---|
| 4,111,332 | 9/1978 | Hurst et al. | 221/7 |
| 4,511,061 | 4/1985 | Gaspardo | 221/211 X |
| 4,613,056 | 9/1986 | Olson | 221/211 |

FOREIGN PATENT DOCUMENTS

| 897676 | 1/1984 | Belgium. | |
|---|---|---|---|
| 802899 | 10/1958 | United Kingdom | 221/211 |

Primary Examiner—F. J. Bartuska
Attorney, Agent, or Firm—Mason, Fenwick & Lawrence

[57] ABSTRACT

In a sowing assembly for single-seed sowing machines, the housing forms a vacuum chamber (1). In the housing is mounted a drive shaft (4) which carries a mounting plate (7) to which is in turn releasably fixed an apertured plate (8) whose radially outer edge is supported on a seal (10) located at the edge of the vacuum chamber (1). A pot-shaped cover member (31) which is supported on the edge of the vacuum chamber (1) forms a seed holding chamber (44) which communicates with a seed receptacle (37).

13 Claims, 5 Drawing Figures

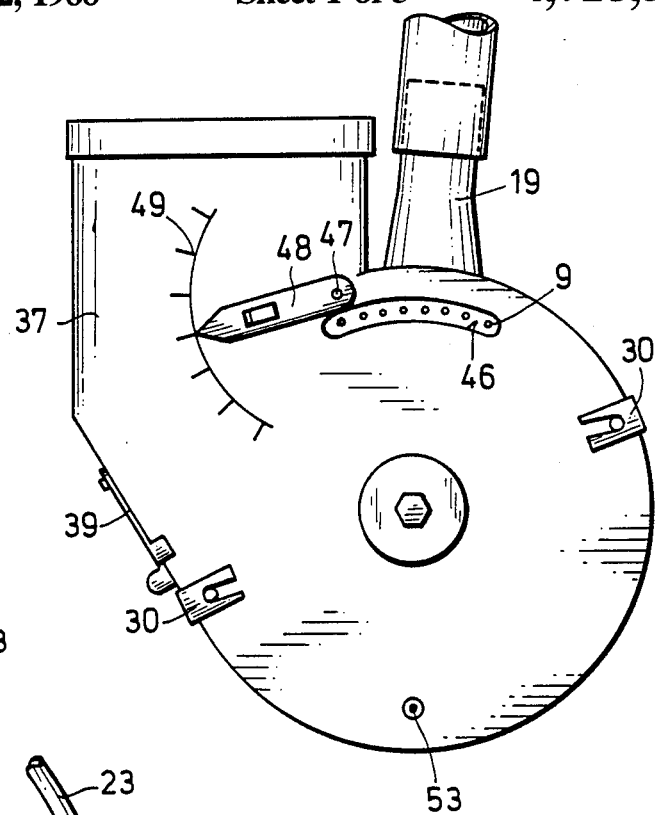
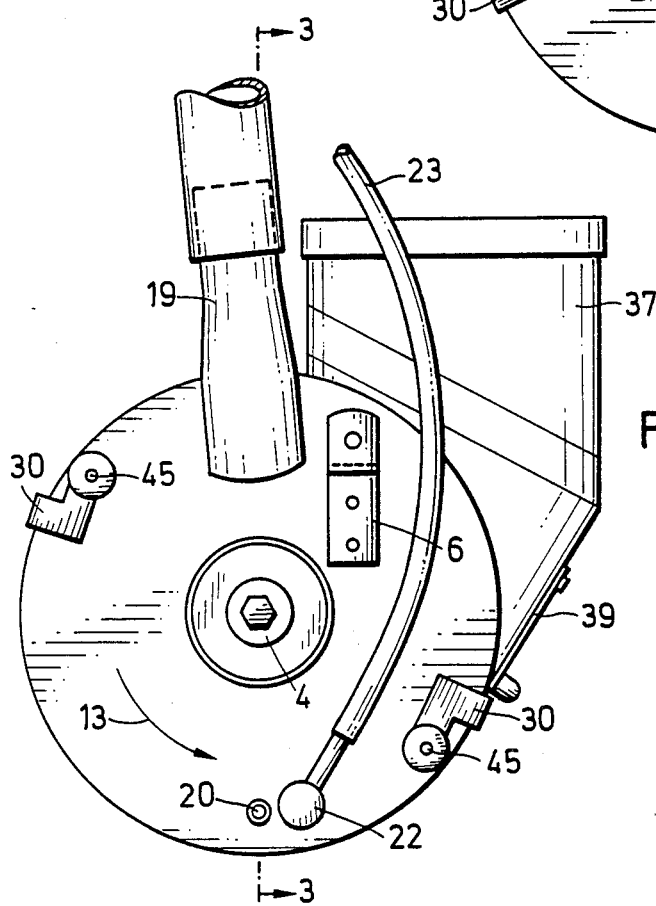
FIG. 1
FIG. 2

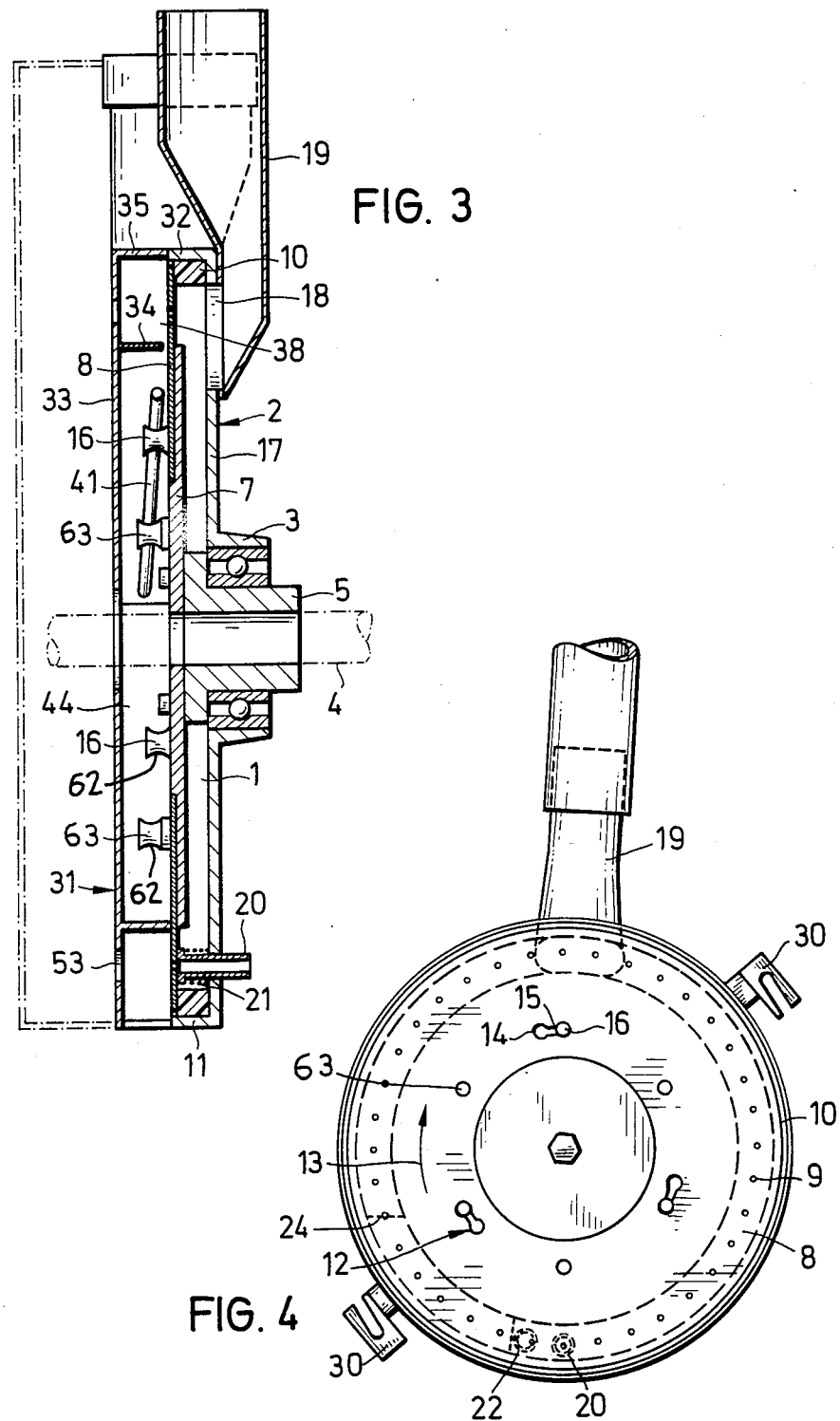

SOWING ASSEMBLY FOR SINGLE-SEED SOWING MACHINES

The innovation concerns a sowing assembly for single-seed sowing machines, which comprises a housing with a vacuum chamber which can be connected to a vacuum source, and a seed holding chamber communicating with a seed receptable, wherein between vacuum chamber and seed holding chamber is provided an apertured plate connected to a drive shaft, whose suction holes are arranged in a reference circle which moves past a separating element, are cut off from the vacuum of the vacuum chamber in a lower region, and at the same time are arranged over a discharge opening of the seed holding chamber.

In known sowing assemblies of this kind, a rotating apertured plate to one side of which a vacuum is applied entrains seeds from a seed stock, which seeds are held against the individual suction holes on the other side of the apertured plate. By means of a separating element, it is attempted to ensure that each suction hole is occupied by only one seed, but gaps are avoided sufficiently reliably. The suction holes are then guided through a region in which they are no longer subjected to the suction force. Here, the seeds then fall into the furrow with the aid of strippers, blow nozzles or the like.

Sowing assemblies of this kind are known both for relatively large seeds, e.g. maize, beans, sugar beet and the like, and for small seeds, e.g. carrot seeds, onion seeds and the like.

Thus, e.g. there is known a single-seed sowing machine (German Auslegeschrift No. 22 42 272) in which there is provided a rotating drum which is closed on one of its faces by an apertured plate. The outer side of this apertured plate is adjoined by a seed chamber. The drum is mounted on a shaft which connects the interior of the drum to a vacuum source. This known apparatus is particularly suitable for sowing relatively large seeds which require a correspondingly large distance between drills. Difficulties may arise with this known machine when fine seeds are to be sown with short distances between drills.

Furthermore, there is already known a single-seed sowing machine (German Utility Model No. 75 30 329) which is intended particularly for sowing seeds of small diameter. In this known sowing machine, the apertured plate is located between a vacuum chamber on one side and a seed holding chamber on the other side. It is driven by a drive shaft, and supported only by the outer edge of the vacuum chamber on a seal provided there. In this known single-seed sowing machine it has become apparent that the mounting and sealing of the apertured plate are disadvantageous. In addition, changing of the apertured plate has proved to be very time-consuming. Finally, this known sowing machine also requires a considerable overall width. This results in a restriction on the partly desirable reduction of distance between drills.

The object of the present innovation is seen as being to provide a sowing assembly for a single-seed sowing machine, which can be used for both fine seeds, that is, seeds of very small diameter, and seeds of larger diameter, has a simple construction with small width, and in addition makes it possible to change the apertured plate easily.

This object is achieved according to the innovation in a sowing assembly of the kind mentioned hereinbefore, by the fact that the apertured plate is releasably attached to a mounting plate rigidly connected to the drive shaft and mounted in the housing of the vacuum chamber, and is supported at its radially outer edge on a seal located at the edge of the vacuum chamber, and the seed holding chamber is formed by a pot-shaped cover member which is supported on the edge of the vacuum chamber and communicates with the seed receptacle.

In this case the apertured plate can be seen as the seal of a vacuum chamber which is formed by the housing and has a simple cylindrical shape. The mounting plate carries the apertured plate and gives it a firm hold. The diameter of the mounting plate can be selected such that only a narrow annular gap remains between its radially outer edge and the edge of the vacuum chamber. The radially outer edge of the apertured plate is supported in sealing relationship on the edge of the vacuum chamber. Since, however, the distance between the outer edge of the mounting plate and the seal may be short, the mounting plate abuts against the seal with sufficient stability, even when it is made of a thin-walled material. The cover member can easily be connected to the housing of the vacuum chamber. The seal between these two components does not need to be airtight, but must simply ensure that seeds do not fall out of the seed chamber. The result of easy connection of the components is that, also, the apertured plate can be removed quickly and replaced by another one.

The simple construction of the cover member also makes it possible to exchange a shallower cover member for another deeper one (and vice versa), in order thus to vary the capacity of the cover member. Therefore a cover member of small volume can be fitted for sowing fine seeds, and a cover member of larger volume can be fitted for sowing larger seeds.

The sowing assembly according to the innovation may furthermore be constructed in such a way that the apertured plate is connected to the mounting plate after the fashion of a bayonet lock. To release or fix the apertured plate on the mounting plate, therefore, it is simply necessary to turn the apertured plate relative to the mounting plate in one or the other circumferential direction, without additional devices.

The sowing assembly according to the innovation may furthermore be constructed in such a way that on the mounting plate are provided several fixing bolts projecting in a direction towards the seed holding chamber and arranged in a circle extending concentrically to the axis of the drive shaft, which bolts have a receiving slot essentially corresponding to the wall thickness of the apertured plate and engage in openings in the apertured plate, whose width decreases in the direction of rotation of the apertured plate.

Consequently, the fixing bolts provided for releasably mounting the apertured plate on the mounting plate may in addition have an agitating effect.

The sowing assembly according to the innovation may furthermore be constructed in such a way that on the apertured plate are disposed several agitator bolts projecting in a direction towards the seed holding chamber and arranged in a circle extending concentrically to the axis of the drive shaft. It is therefore possible to mount additional bolts.

The sowing assembly according to the innovation may furthermore be constructed in such a way that the fixing bolts and the agitator bolts are arranged in a common reference circle. In this way therefore, a row of elements projecting into the seed holding chamber is produced, in a common reference circle.

The sowing assembly according to the innovation may furthermore be constructed in such a way that in the cover member is inserted a partition which closes off from the lower region an upper seed chamber communicating with the seed receptacle. Consequently, a relatively small seed chamber may be provided, which is particularly appropriate for using fine seeds. At its lowest point, this seed chamber may be provided with a closure, in order to be able to empty out the seeds completely, if necessary.

The sowing assembly according to the innovation may furthermore be constructed in such a way that in the partition is flexibly mounted a rod-like agitator, one end of which coacts with the fixing and agitator bolts projecting into the seed holding chamber, while the other end thereof extends into the region of the inlet opening between seed receptacle and upper seed chamber. The bolts mounted on the apertured plate thus engage one end of the agitator, and cause the other end thereof to be moved into the seed chamber in the region of the inlet opening above the partition, and there prevent bridging and blockages of any kind.

The sowing assembly according to the innovation may furthermore be constructed in such a way that the fixing and agitator bolts have working surfaces extending over different distances into the seed holding chamber and coacting with the agitator. By this means can be achieved the result that the end of the agitator which is located in the seed chamber is displaced not only in one plane, but also at an angle thereto. The agitating effect is thus further improved.

The sowing assembly according to the innovation can furthermore be constructed in such a way that the seal located at the edge of the vacuum chamber is constructed as a felt gasket.

The sowing assembly according to the innovation may furthermore be constructed in such a way that the apertured plate is prestressed in a direction towards the seal located at the edge of the vacuum chamber. This results in particularly reliable sealing of the vacuum chamber at its radially outer edge.

The sowing assembly according to the innovation may furthermore be constructed in such a way that the housing of the vacuum chamber and the cover member are deep-drawn components. By this means, manufacturing costs are substantially reduced and weight is reduced considerably.

The sowing assembly according to the innovation may furthermore be constructed in such a way that the cover member is releasably connected to the housing of the vacuum chamber by means of clips. The clips may in this case be essentially U-shaped and engage from a radially outer point over the housing of the vacuum chamber and the cover member. The clips may be mounted e.g. on a lever which is mounted pivotably on the housing or on the cover member. Release and closing and hence changing of the apertured plate are thus further simplified.

In the following part of the specification, an embodiment of the sowing assembly according to the innovation is described with the aid of drawings.

FIG. 1 shows a side view of the cover member of the sowing assembly according to the innovation, FIG. 2 shows a side view of the housing of the vacuum chamber of the assembly according to the innovation, FIG. 3 shows a section through line 3—3 in FIG. 2, FIG. 4 shows a side view of the housing of the vacuum chamber with the apertured plate fitted and the cover member removed, and FIG. 5 shows a view of the inner side of the cover member.

The sowing assembly according to the innovation has a pot-shaped housing 2 forming a vacuum chamber 1, with a hub 3 in which is mounted a hub member 5 seated non-rotatably on a drive shaft 4. The housing 2 can be connected by a bracket 6 in a normal manner (not shown) to the frame of a single-seed sowing machine. The drive shaft 4 is set in rotation by means of drive elements, not shown.

On the hub member 5 is seated a mounting plate 7 which, on rotation of the drive shaft 4, rotates with the latter. To the mounting plate 7 is in turn connected an apertured plate 8 in which suction holes 9 are arranged with a given spacing in a reference circle. The diameter of these suction holes 9 is smaller than the diameter of the seeds to be sown. At its radially outer edge, the apertured plate 8 abuts against a felt gasket 10 which is treated with graphite. The outside diameter of the apertured plate 8 is smaller than the inside diameter of the cylindrical outer wall 11 of the housing 2.

The apertured plate 8 appears slightly frustoconical when no load is applied, whereby when mounted the apertured plate 8 is stressed at its outer edge in a direction towards the gasket 10.

The apertured plate 8 is provided with slots 12 (FIG. 4). The direction of rotation of the apertured plate 8 is shown here by the arrow 13. The slots 12 have, at their trailing ends in the direction of rotation, a section 14 of large diameter which is adjoined by a narrower slot section 15.

On the mounting plate 7 are mounted fixing bolts 16 arranged with their axes parallel to each other. These fixing bolts 16 are selected in respect of diameter and positioning so as to be able to pass through sections 14 of the slots 12 in the apertured plate 8. The fixing bolts 16 each have, immediately over the mounting plate 7, a receiving slot which essentially corresponds to the wall thickness of the apertured plate 8. To fix the apertured plate 8 to the mounting plate 7, therefore, it is simply necessary to mount the apertured plate 8 on the mounting plate 7 in such a way that the fixing bolts 16 pass through sections 14 of the slots 12. Then the apertured plate 8 must be rotated relative to the mounting plate 7 in the anticlockwise direction of the assembly (FIG. 4).

The housing 2 of the vacuum chamber 1 has a rear wall 17. In this rear wall 17 is provided an opening 18 of large dimensions for a vacuum fitting 19. The dimensions of the vacuum fitting 19 make it possible to operate with a low vacuum and thus treat the seeds gently.

In the rear wall 17 is provided a connecting pipe 20 which is biassed by a spring 21 against the apertured plate 8. The free cross-section of the connecting pipe 20 is in this case placed in such a way that the individual suction holes 9 of the apertured plate 8 must travel across this cross-section. At its end protruding outwardly from the rear wall 17, the connecting pipe 20 communicates with the atmosphere. This means that at the suction hole 9 which is in front of the connecting pipe 20, the vacuum prevailing in the vacuum chamber 1 is interrupted, and atmospheric pressure is applied instead. The retaining force applied to the seed being held here is thus broken. The seed is released and drops down.

Next to the connecting pipe 20 is a pneumatic fitting 22 which is connected to a compressed air line 23 and is intended for blowing out the suction holes 9 in the apertured plate 8 to clean them after the seeds have dropped (FIG. 2).

Between the radially outer edge of the mounting plate 7 and the gasket 10, the apertured plate 8 covers an annular region. In this annular region are located, in the lower section of the assembly (FIG. 4), the connecting pipe 20 and the pneumatic fitting 22. The side of the apertured plate 8 facing towards the vacuum chamber 1 is covered by a liner 24 in this annular region, behind the pneumatic fitting 22 in the direction of rotation of the apertured plate (arrow 13).

A cover member 31 is releasably connected by U-shaped clips 30 to the housing 2 of the vacuum chamber 1. This cover member 31, through which can pass the drive shaft 4, is also pot-shaped. Its outer edge 32 comes to rest on the outer wall 11 of the housing 2. These parts 11 and 32 must be fitted together so tightly that seeds cannot pass between them. An airtight connection is not necessary here.

The cover member 31 has a base 33. From this base 33 extends a partition 34 which projects into the plane of the edge 32, and therefore ends immediately before the apertured plate 8 in the assembled state. In the cylindrical wall portion 35 with the edge 32 is provided an inlet opening 36 for the seeds, which enter a seed chamber 38 formed above the partition 34, through the inlet opening 36 from a seed receptacle 37.

The partition 34 begins, as FIG. 5 shows, at the lower end of the inlet opening 36, and climbs upwardly from here. At this beginning of the partition 34, the seed receptacle 37 ends. Here it is provided with a flap 39 which allows complete emptying of the sowing assembly of seeds which are still inside it.

In the partition 34 is inserted a piece of rubber-like material 40 which carries a rod-like flexible agitator 41. One end 42 of the agitator 41 is located below the partition 34, while the other end 43 is disposed above the partition 34 in the region of the inlet opening 36. The piece of material 40 allows pivoting of the agitator 41 in all directions.

When the cover member 31 is fitted, the end 42 of the agitator 41 comes within the range of travel of the fixing bolts 16 and the agitator bolts 63 mounted on the apertured plate 8. These bolts 16, 63 have (FIG. 3) curved working surfaces 62. Between every two fixing bolts 16 is mounted an agitator bolt 63. The working surfaces 62 of the fixing bolts 16 and agitator bolts 63 advance over different lengths into the seed holding chamber 44 which is bounded by the cover member 31. Cooperation of the agitator 41 with the bolts 16, 63 thus causes both pivoting of the agitator 41 in the plane of FIG. 5 and movement of the ends of the agitator 41 perpendicularly thereto.

The clips 30 are fixed to the housing 2 (FIG. 2) so as to be capable of pivoting about pivot pins 45.

In the base 33 of the cover member 31 is provided an inspection window 46 through which the state of occupation of the individual suction holes 9 in the apertured plate 8 can be monitored.

In the base 33 is further mounted a cam 47 on the outer end (FIG. 1) of which is mounted an adjuster 48 which coacts with a scale 49. Abutting against the cam 47, inside the cover member 31 (FIG. 5), is a flexible metal strip 50 which is rigidly connected at 51 to the cylindrical wall portion 35 of the cover member 31. This metal strip is designed as a separating element. Its distance from the reference circle in which are arranged the suction holes 9 of the apertured plate 8 can be varied by appropriate adjustment of the adjuster 48.

The cylindrical wall portion 35 of the cover member 31 is cut open in its lower region (FIG. 5), and forms a stripper 52. Thus free space is provided for dropping of the seeds released from the suction holes 9 of the apertured plate 8.

An opening 53 in the base 33 allows passage of air emerging from the pneumatic fitting 22.

The housing 2 of the vacuum chamber 1 and the cover member 31 are, according to the practical example, made from sheet metal as deep-drawn components.

I claim:

1. Sowing apparatus for a single-seed sowing machine, said apparatus comprising:
   a housing divided into first and second regions;
   a vacuum chamber defined in said first region and adapted to be connected to a vacuum source;
   a seed chamber and a seed holding chamber defined in said second region, said seed holding chamber having a discharge opening;
   a partition separating said seed chamber from said seed holding chamber;
   a seed receiving receptacle in communication with said seed chamber;
   an apertured plate rotatable within said housing between said vacuum chamber and said seed holding chamber, said plate including holes arranged in a reference circle that moves past said partition and said discharge opening;
   mean for cutting off the vacuum through said holes as they pass over said discharge opening;
   a drive shaft rotatably mounted within said housing;
   a mounting plate positioned within said vacuum chamber and mounted for rotating by said drive shaft;
   means for releasably mounting said apertured plate to said mounting plate; and
   a seal fixedly located at the edge of the vacuum chamber, said seal supporting the entire radial outer edge of said apertured plate, as said apertured plate moves relative to said seal, the radial outer edge of said plate being stressed in a direction toward said seal.

2. Sowing apparatus of claim 1, further comprising a pot-shaped cover member supported on the edge of said vacuum chamber, said cover member defining said seed holding chamber and including means for providing the communication with said seed receiving receptacle.

3. Sowing apparatus according to claim 2, wherein the apertured plate is connected to the mounting plate by a bayonet mounting means.

4. Sowing apparatus according to claim 3, wherein said bayonet mounting means comprises several fixing bolts which project in a direction towards the seed holding chamber, said bolts being arranged on said mounting plate in a circle extending concentrically to the axis of the drive shaft receiving slots defined on said bolts and essentially corresponding to the wall thickness of the apertured plate, said slot engaging openings in the apertured plate, the width of said openings decreasing in the direction of rotation of the apertured plate.

5. Sowing apparatus according to claim 3, wherein on the apertured plate are disposed several agitator bolts projecting in a direction towards the seed holding chamber and arranged in a circle extending concentrically to the axis of the drive shaft, and wherein the fixing bolts and the agitator bolts are arranged in a common reference circle.

6. Sowing apparatus according to claim 4, wherein the cover member is inserted a partition which closes off from the lower region an upper seed chamber communicating with the seed receptacle.

7. Sowing apparatus according to claim 6, wherein in the partition is flexibly mounted a rod-like agitator, one end of which coacts with the fixing and agitator bolts projecting into the seed holding chamber, while the other end thereof extends into the region of the inlet opening between the seed receptacle and upper seed chamber.

8. Sowing apparatus according to claim 7, wherein the fixing and agitator bolts have working surfaces extending over different distances into the seed holding chamber and coacting with the agitator.

9. Sowing apparatus according to claim 8, wherein the seal located at the edge of the vacuum chamber is a felt gasket.

10. Sowing apparatus according to claim 9, wherein the apertured plate is prestressed in a direction towards the seal located at the edge of the vacuum chamber.

11. Sowing apparatus according to claim 10, wherein the housing of the vacuum chamber and the cover member are deep-drawn components.

12. Sowing appartus according to claim 11, wherein the cover member is releasably connected to the housing of the vacuum chamber by means of clips.

13. Sowing apparatus for a single-seed sowing machine, said apparatus comprising:
   a housing divided into first and second regions;
   a vacuum chamber defined in said first region and adapted to be connected to a vacuum source;
   a seed chamber and a seed holding chamber defined in said second region, said seed holding chamber having a discharge opening;
   a partition separating said seed chamber from said seed holding chamber;
   a seed receiving receptacle in communication with said seed chamber;
   an apertured plate rotatable within said housing between said vacuum chamber and said seed holding chamber, said plate including holes arranged in a reference circle that moves past said partition and said discharge opening;
   mean for cutting off the vacuum through said holes as they pass over said discharge opening;
   a drive shaft rotatably mounted within said housing;
   a mounting plate positioned within said vacuum chamber and mounted for rotation by said drive shaft;
   means for releasably mounting said apertured plate to said mounting plate;
   a seal fixedly located at the edge of the vacuum chamber, said seal supporting the radial outer edge of said apertured plate, as said apertured plate moves relative to said seal;
   a pot-shaped cover member supported on the edge of said vacuum chamber, said cover member defining said seed holding chamber and including means for providing the communication with said seed receiving receptacle;
   said apertured plate being connected to said mounting plate by a bayonet assembly; and
   said bayonet mounting assembly including several fixing bolts which project in a direction towards said seed holding chamber, said bolts being arranged on said mounting plate in a circle extending concentrically to the axis of the drive shaft receiving slots defined on said bolts and essentially corresponding to the wall thickness of the apertured plate, said slot engaging openings in the apertured plate, the width of said openings decreasing in the direction of rotation of the apertured plate.

* * * * *